United States Patent [19]

Donsbach et al.

[11] Patent Number: 5,587,191

[45] Date of Patent: Dec. 24, 1996

[54] PROCESS FOR MAKING HIGHLY OXYGENATED DRINKING WATER AND DRINKING WATER MADE BY THE PROCESS

[75] Inventors: Kurt W. Donsbach, 880 Canarios Ct., #210, Chula Vista, Calif. 91910-7810; Ricardo Cazares, 870 Canarios Ct., #3, Chula Vista, Calif. 91910

[73] Assignees: Chang S. Kim, Honolulu, Hi.; Kurt W. Donsbach; Ricardo Cazares, both of Chula Vista, Calif.

[21] Appl. No.: 507,584

[22] Filed: Jul. 26, 1995

[51] Int. Cl.⁶ .................................................. A23L 2/00
[52] U.S. Cl. .................................................. 426/66; 426/67
[58] Field of Search .................................. 426/66, 67, 330, 426/477, 590; 424/53

[56] References Cited

U.S. PATENT DOCUMENTS 5,006,352   4/1991   Zoltai et al. .............................. 426/330
5,130,124   7/1992   Merianos et al. ......................... 424/53

*Primary Examiner*—George Yeung
*Attorney, Agent, or Firm*—Bernard L. Kleinke; Peter P. Scott

[57] ABSTRACT

A process for making highly oxygenated drinking water includes initially preparing a stabilized hydrogen peroxide solution, and then adding a suitably small quantity of it to natural drinking water. The stabilized hydrogen peroxide solution is made by adding a complex polymer in the form of polyvinylpyrrolidone to a quantity of diluted hydrogen peroxide. Various different molecular weight compositions of polyvinylpyrrolidone are added at different times according to a preferred technique.

17 Claims, No Drawings

PROCESS FOR MAKING HIGHLY OXYGENATED DRINKING WATER AND DRINKING WATER MADE BY THE PROCESS

TECHNICAL FIELD

The present invention relates in general to a process for making a highly oxygenated drinking water, and the water made by the process. It more particularly relates to a highly oxygenated drinking water composition product, which contains stabilized oxygen.

BACKGROUND ART

It is well known that oxygen is essential for humans to sustain life. Pure oxygen, therefore, has been administered in various concentrations to facilitate breathing and to provide a sense of well-being.

While the benefits of oxygen are well known, the administration of high concentrations of oxygen to human beings, has been heretofore substantially limited to gaseous administrations only. However, if a suitable highly oxygenated drinking water could be made, then one could easily and conveniently receive the benefits of oxygen by merely drinking such water. In this regard, such highly oxygenated drinking water could be readily bottled, and marketed in a similar manner to other conventional bottled drinking water. Drinking water is currently marketed in transparent or translucent glass or plastic bottles.

However, due to the nature of oxygen, it would be extremely difficult to have highly oxygenated pure drinking water stored in a conventional bottle for long periods of time, and still retain its oxygenated nature at the same effective levels of concentration. In this regard, in order to have high quality drinking water, there can not be present any undesirably high concentrations of extraneous substances used to buffer or otherwise retain the oxygen.

Such buffering or other substances could make the drinking water undesirable for human consumption. It would not be desirable to significantly alter the taste or color of the natural drinking water. Also, of course, any additives must not render the natural drinking water toxic or otherwise deteriorate the quality of the drinking water below accepted standards. Any additives should not, in any manner, adversely affect the taste or other qualities of the water.

Also, the bottled drinking water must be able to be stored for long periods of time prior to consumption. Thus, in order to permit the oxygenated drinking water to stand for long periods of time, the oxygen content must remain in tact and be stable, and not undergo unwanted decomposition. Shelf life as well as storage and transportation, are important considerations for bottled drinking water. The storage in clear bottles could also present a significant problem. In this regard, light impinging on the oxygenated water could help accelerate decomposition of the highly oxygenated drinking water.

One approach to highly oxygenated drinking water could be to add a very small concentration of hydrogen peroxide to natural drinking water. With such an additive, the hydrogen peroxide would achieve the desired result of adding the desired oxygen to the water. However, it is well known that hydrogen peroxide is very unstable, especially in the presence of water. For example, reference may be made to U.S. Pat. Nos. 3,480,557; 5,077,047; 5,130,124; 5,206,385; and 5,312,619.

The foregoing patents disclose various additives for use with hydrogen peroxide for stabilizing it, when used as an antiseptic agent or the like. Thus, it is quite clear that hydrogen peroxide is unstable, and thus its level of concentration will become diminished with time, unless stabilization steps are taken. However, in order to stabilize hydrogen peroxide in very minute concentration levels in drinking water, the stabilization problem is far more difficult, and has been heretofore unattainable.

Hydrogen peroxide will disassociate in basic or acidic water conditions, as well as in the presence of metal ions. Thus, the pH of the water, as well as the metal ion content, is critical, should hydrogen peroxide be added. Since only minute quantities of hydrogen peroxide could be added to the drinking water to avoid alteration of the taste, the presence of impurities or other ingredients in the water create a highly unstable environment for the hydrogen peroxide.

If buffering or other additives are employed in an attempt to stabilize the hydrogen peroxide, the taste of the resulting treated drinking water could be altered in an undesirable manner. Also, in view of the requirement of bottling drinking water in clear containers, achieving the stability of hydrogen peroxide in drinking water is extremely difficult.

Thus, it would be extremely desirable to have a process for making highly oxygenated drinking water, which can be stored in clear containers for long periods of time and still maintain the desired levels of concentration of additional oxygen.

DISCLOSURE OF INVENTION

Therefore, the principal object of the present invention is to provide a new and improved method of formulating highly oxygenated drinking water, which can be stored for long periods of time, even in translucent containers, while maintaining desired levels of oxygenation.

Another object of the present invention is to provide such a new and improved method of formulating highly oxygenated drinking water and the drinking water made by the method, wherein hydrogen peroxide is an additive and yet undue hydrogen peroxide breakdown does not occur during storage prior to consumption.

Briefly, the above and further objects of the present invention are realized by providing a new and improved stabilized composition of highly oxygenated drinking water made by an inventive method.

A process for making highly oxygenated drinking water includes initially preparing a stabilized hydrogen peroxide solution, and then adding a suitably small quantity of it to natural drinking water. The stabilized hydrogen peroxide solution is made by adding a complex polymer in the form of polyvinylpyrrolidone to a quantity of diluted hydrogen peroxide. Various different molecular weight compositions of polyvinylpyrrolidone are added at different times according to a preferred technique.

It has been discovered, by following the inventive process, that highly oxygenated drinking water can be produced, and it contains many times more oxygen than conventional natural drinking water. The inventive drinking water can be stored conveniently in conventional clear bottles or other containers for long periods of time, without experiencing undue decomposition of the hydrogen peroxide. Also, the quality of the water is not compromised. The color and taste of the inventive drinking water is not adversely affected.

BEST MODE FOR CARRYING OUT THE INVENTION

The following examples were given to aid in understanding the invention, but it is to be understood that the particular procedures, conditions and materials of these examples are not intended as limitations of the present invention.

In accordance with the novel process of the present invention, a stabilized complex composition of hydrogen peroxide and is added to drinking water to formulate the inventive highly oxygenated water. According to the inventive process, the stabilized hydrogen peroxide solution is made by adding slowly a suitable quantity of a 35% by weight hydrogen peroxide concentrate to purified distilled water and mixing them together in small quantities at a time. The process requires the pouring of the concentrated 35% by weight $H_2O_2$ over the purified water in a closed glass lined reactor with continuous agitation utilizing a stainless steel stirrer driven by a pneumatic or explosion proof motor until an aqueous solution containing 17.5% by weight hydrogen peroxide is formed.

At the end of the dilution process, a sample of the diluted 17.5% by weight $H_2O_2$ is taken to verify pH, temperature, and concentration. Upon verification of the 17.5% solution, the resulting 17.5% hydrogen peroxide solution is refrigerated in the glass lined reactor by a recirculating pump. In this regard, the temperature of the 17.5% $H_2O_2$ solution is lowered to a temperature between about 5° C. and about 8° C.

A 15% by weight charge of polyvinylpyrrolidone K15 having a molecular weight of about 10,000 is then added slowly to the aqueous 17.5% hydrogen peroxide solution and continuously agitated for a sufficient amount of time of about 60 minutes until the K15 PVP charge is completely dissolved in the aqueous $H_2O_2$ solution. When the K15 PVP is dissolved, a sample of the resulting 15% K15 PVP-$H_2O_2$ solution is taken to verify pH, temperature, density and the concentration of the $H_2O_2$.

Next, a 50% by weight charge of polyvinylpyrrolidone K30 having a molecular weight of about 40,000 is then added slowly to the resulting aqueous 15% K15 PVP-$H_2O_2$ complex solution with continuous agitation for another sufficient amount of time of about until the K30 PVP charge is completely dissolved therein. When the PVP is dissolved, a sample of the resulting 50% K30 PVP-$H_2O_2$ solution is taken to verify pH, temperature, density and $H_2O_2$ concentration.

After proper verification, a 5% by weight charge of polyvinylpyrrolidone having a molecular weight K90 is added to the resulting complex 50% K30 PVP-$H_2O_2$ aqueous solution and agitated continuously for still yet another sufficient period of time of about 30 minutes until the K90 PVP charge is completely dissolved.

Thereafter, the refrigeration is terminated. Agitation of the resulting 5% K90 PVP-$H_2O_2$ complex solution, however, is continued for at least another period of time of about 8 hours.

Thereafter, the resulting 5% K90 PVP-$H_2O_2$ solution is held at rest for a rest period time of about 24 hours. The rest period allows bonding of the PVP molecules to the hydrogen peroxide, resulting in a stabilized aqueous PVP-$H_2O_2$ solution containing about 17% by weight of hydrogen peroxide. Thereafter, the solution is again mixed for about another 2 hour period. The resulting solution at the end of the mixing period is a 17% stabilized $H_2O_2$ solution. The solution is then sampled and tested to verify temperature, density and the concentration of the $H_2O_2$ solution.

The resulting stabilized solution may then be stored in a clean, perfectly degreased, high density polyethylene plastic container until the highly oxygenated water product is to be produced.

Finally the highly oxygenated water is formulated for varying strengths of available oxygen in accordance with the following examples:

EXAMPLE I

For highly oxygenated water having four times the normal quantity of oxygen add 5 milligrams of the 17% stabilized $H_2O_2$ solution per liter of purified distilled water to form a desired oxygenated water product having about 4% stabilized oxygen.

The resulting oxygenated water product is then transferred into a suitable number of clear plastic containers or the like for shipping and marketing purposes.

This process of making Example I has been found to provide the minimum amount of oxygen to achieve the objects of the invention.

EXAMPLE II

The composition of the present invention was tested to determine the maximum additive amount of the 17% stabilized PVP-$H_2O_2$ solution to purified water without causing an unpleasant taste or a mucous lining irritation.

For highly oxygenated water having 20 times the normal quantity of oxygen add 25 milligrams or less of the stabilized aqueous PVP-$H_2O_2$ solution per liter of purified distilled water and mix for at least 2 hours to form the desired oxygenated water product.

The resulting oxygenated water product is then transferred into a suitable number of clear plastic containers or the like for storage and shipping purposes.

In this example, it was noted that any greater quantity than 25 milligrams per liter of the stabilized aqueous PVP-$H_2O_2$ solution results in an unpleasant taste and slight irritation to mucous linings.

The process of making Example II is the preferred process and has been found to provide the maximum amount of stable oxygen to achieve the objects of the invention.

EXAMPLE III

As a final example, a suitable vat is prepared according to well known sterile protocols. Next 50 gallons of purified distilled spring water is added to about 15 cc of a 17% stable hydrogen peroxide concentrate prepared according to the prior enumerated protocol as specified in Example 1. The resulting solution is then gently agitated for about 60 seconds with a sterile paddle. The resulting solution is a concentration of about 79 parts per millions of hydrogen peroxide which is suitable for human consumption.

In each of the above enumerated examples, the aqueous PVP-$H_2O_2$ solutions serve as active oxygen agents, while the purified water components serve as vehicles for transporting captured oxygen molecules to the blood stream of a person drinking the oxygenated water solution. Thus, in use, the PVP-$H_2O_2$ solution when consumed provides an immediate and beneficial oxygen lift.

In other uses, depending upon the total parts per million of $H_2O_2$ concentrate added to purified water, the oxygenated water has a variety of applications. For example, the oxygenated water can function as a bacterial agent to preserve organic products such as meats, cheeses, vegetables, fruits and beverages from a significant number of bacteria without providing any undesired flavor and without altering the natural properties of the processed food and beverages.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of preparing a highly oxygenated drinking water product, comprising:
    (a) adding to distilled purified water a sufficient volume of hydrogen peroxide to form an aqueous solution of 0.075% hydrogen peroxide by weight;
    (b) adding a 15% by weight charge of polyvinylpyrrolidone K15 having a molecular weight of 10,000 to the aqueous solution of hydrogen peroxide prepared in step (a) until dissolved therein;
    (c) adding a 50% by weight charge of polyvinylpyrrolidone K30 having a molecular weight of 40,000 to the mixture as prepared in step (b) until dissolved therein;
    (d) adding a 5% by weight charge of polyvinylpyrrolidone K90 to the mixture as prepared in step (c) until dissolved therein; and
    (e) adding sufficient quantity (Q) of the mixture as prepared in step (d) to purified distilled water to help charge the water with active oxygen in a predetermined percentage.

2. A method according to claim 1, wherein said sufficient quantity (Q) is about 5 milligrams of the mixture per liter of water to charge the water with active stable oxygen in a predetermined percentage of about 4%.

3. A method according to claim 2, wherein said sufficient quantity (Q) is about 25 milligrams of the mixture per liter of water to charge the water with active stable oxygen in a predetermined percentage of about 20%.

4. A method according to claim 1 wherein step (b) includes:
    agitating the mixture as prepared in step (a) for an initial period of time while adding the 15% by weight charge of PVP having a molecular weight of K15.

5. A method according to claim 4 wherein step (c) includes:
    agitating the mixture as prepared in step (b) for a sufficient period of time while adding the 50% by weight charge of PVP having a molecular weight of K30.

6. A method according to claim 5 wherein step (d) includes:
    agitating the mixture as prepared in step (c) for a final period of time while adding the 5% by weight charge of PVP having a molecular weight of K90.

7. A method according to claim 6 further comprising: waiting another sufficient period of time after the agitated mixture of step (d) has been prepared before commencing step (e).

8. A method according to claim 7 further comprising:
    (1) mixing the mixture as prepared in step (d) for a mixing period of time; and
    (2) pouring the mixture as prepared in step (1) into at least one clear container for shipping purposes.

9. An oxygenated water product prepared by the method of claim 1.

10. An oxygenated water product prepared by the method of claim 8.

11. A method according to claim 7, further comprising:
    (g) mixing the mixture as prepared in step (e) for a first period of time.

12. A method according to claim 11 further comprising:
    (f) pouring the mixture as prepared in step (e) into one or more clear containers for storage purposes.

13. Oxygenated water comprising:
    (a) a quantity of a stabilized composition of hydrogen peroxide composed of (1) about 0.075% by weight of hydrogen peroxide added as a 30% by weight aqueous solution; (2) about 15% by weight of a water soluble polyvinylpyrrolidone having a K value of about K15; (3) about 50% by weight of a water soluble polyvinylpyrrolidone having a K value of about K30; and (4) about 5% by weight of a water soluble polyvinylpyrrolidone having a K value of about K90; and (b) a quantity of purified distilled water.

14. Oxygenated water according to claim 13 wherein the quantity of said stabilized composition of hydrogen peroxide is about 5 milligrams and wherein the quantity of said water is about 1 liter.

15. Oxygenated water according to claim 13 wherein the quantity of said stabilized composition of hydrogen peroxide is about 25 milligrams and wherein the quantity of said water is about 1 liter.

16. A method of making highly oxygenated drinking water, comprising:
    initially preparing a stabilized hydrogen peroxide solution composed of about 0.075% by weight of hydrogen peroxide added as a 30% by weight aqueous solution, about 15% by weight of a water soluble polyvinylpyrrolidone having a K value of about K15, about 50% by weight of a water soluble polyvinylpyrrolidone having a K value of about K30, and about 5% by weight of a water soluble polyvinylpyrrolidone having a K value of about K90; and
    adding a quantity of said stabilized hydrogen peroxide solution to a quantity of drinking water to highly oxygenate the drinking water for consumption purposes.

17. A composition of highly oxygenated water, comprising:
    an aqueous solution of about 0.075% hydrogen peroxide;
    a 15% by weight quantity of a complex polymer in the form of polyvinylpyrrolidone K15;
    a 50% by weight quantity of a complex polymer in the form of polyvinylpyrrolidone K30;
    a 5% by weight quantity of a complex polymer in the form of polyvinylpyrrolidone K90; and
    a quantity of drinking water.

* * * * *

UNITED STATES PATENT AND TRADEMARK OFFICE
CERTIFICATE OF CORRECTION

PATENT NO. : 5,587,191
DATED : December 24, 1996
INVENTOR(S) : Kurt W. Donsbach, et al It is certified that error appears in the above-indentified patent and that said Letters Patent is hereby corrected as shown below:

Column 6, line 16, delete "0.075%" and substitute therefor --.075%--.

Column 6, line 37, delete "0.075%", and substitute therefor --.075%--.

Column 6, line 52, delete "0.075%", and substitute therefor --.075%--.

Column 6, line 52, after "peroxide", insert --by weight--.

Signed and Sealed this

Seventeenth Day of June, 1997

Attest:

BRUCE LEHMAN

Attesting Officer

Commissioner of Patents and Trademarks